(12) United States Patent
Lau et al.

(10) Patent No.: US 8,312,351 B2
(45) Date of Patent: Nov. 13, 2012

(54) PEER-TO-PEER COMMUNICATION IN WIRELESS SENSOR NETWORK THROUGH DELAY RESPONSE BETWEEN PACKETS

(75) Inventors: Chun Hau Lau, Singapore (SG); Boon Hee Soong, Singapore (SG); Lili Zhang, Beijing (CN)

(73) Assignees: Nanyang Technological University, Singapore (SG); Singapore Technologies Dynamics Pte Ltd, Singapore (SG)

( * ) Notice: Subject to any disclaimer, the term of this patent is extended or adjusted under 35 U.S.C. 154(b) by 394 days.

(21) Appl. No.: 12/745,730

(22) PCT Filed: Oct. 20, 2008

(86) PCT No.: PCT/SG2008/000404
§ 371 (c)(1),
(2), (4) Date: Jun. 2, 2010

(87) PCT Pub. No.: WO2009/078811
PCT Pub. Date: Jun. 25, 2009

(65) Prior Publication Data
US 2010/0257424 A1    Oct. 7, 2010

(30) Foreign Application Priority Data
Dec. 17, 2007    (SG) ............................ 200718790-9

(51) Int. Cl.
*G06F 11/00* (2006.01)
(52) U.S. Cl. ........................................ 714/775
(58) Field of Classification Search .................... 714/775
See application file for complete search history.

(56) References Cited

U.S. PATENT DOCUMENTS
7,920,600 B2 *    4/2011    Tamura ..................... 370/516
(Continued)

FOREIGN PATENT DOCUMENTS
EP    1322217 B1    11/2005

OTHER PUBLICATIONS

Sanzgiri K. et al. "The utility of perceptive communication between distant nodes" TRIDENTCOM 2006 Testbeds and Research Infrastructure for the Development of Networks and Communities Publication Date: Mar. 1-3, 2006.

(Continued)

*Primary Examiner* — Bryce Bonzo
(74) *Attorney, Agent, or Firm* — Jacobson Holman PLLC

(57) ABSTRACT

A method for transmitting data between first and second nodes in a network comprises (a) the first node sending a start packet to the second node, (b) the first node starting a first counter concurrently with sending the start packet, wherein the first counter starts counting, (c) the second node starting a timer in response to the start packet, (d) the second node starting a second counter in response to the timer running for a predetermined delay time, wherein the second counter starts counting, (e) the first node stopping the first counter and sending a stop packet in response to the first node determining that the number of accumulated first counts corresponds to the data (thereby transmitting the data solely as a time interval between the start and stop packets), the second node stopping the second counter in response to the stop packet (and receiving the transmitted data).

29 Claims, 8 Drawing Sheets

U.S. PATENT DOCUMENTS

2004/0066313 A1 4/2004 Ong et al.
2004/0120292 A1 6/2004 Trainin
2007/0280247 A1* 12/2007 Mera et al. ............... 370/392
2012/0157033 A1* 6/2012 Ou et al. ................. 455/404.1

OTHER PUBLICATIONS

Zhu et al. "Challenges: Communication through Silence in Wireless Sensor Networks" ACM International Conference on Mobile Computing and Networking, Mobicom '05 Modulation SPIE Nov. 1998.
Hayes et al. Optical Wireless Communication using Digital Pulse Interval.
Aldibbia T et al. "The characteristics of dual header pulse interval modulation (DHPIM) in indoor optical wireless systems" SCI 2001, Florida, USA, Jul. 2001, vol. IV, No. 151, pp. 24-28.
Mukhtar S. "Interval Modulation: A New Paradigm for the Design of High Speed Communication Systems" California Institute of Technology Thesis Jul. 7, 2004.
Zhu Y. "Energy-Efficient Communications Strategies for Wireless Sensor Networks" Georgia Institute of Technology Thesis Aug. 2007.
Ghassemlooy Z. et al. Indoor Optical Wireless Communication Systems—Part I: Review Archive in Wayback Published May 10, 2005, http://soe.unn.ac.uk/ocr/downloads/parti-rev.pdf.

* cited by examiner

PEER-TO-PEER COMMUNICATION IN WIRELESS SENSOR NETWORK THROUGH DELAY RESPONSE BETWEEN PACKETS

FIELD OF THE INVENTION

The present invention relates to a wireless sensor network and more particularly to a wireless sensor network with energy efficient peer-to-peer virtual communication though delay response between packets.

BACKGROUND OF THE INVENTION

Wireless sensor networks are an emerging technology that is gaining popularity for its wide application. A typical wireless sensor network includes sensor nodes deployed in an ad hoc fashion for the purpose of physical sensing and monitoring of the environment. With wireless communication capability, these sensor nodes collaboratively disseminate the sensed data from a target location to a destination, which is usually a data gathering and processing point. Using this technology, users at the data gathering and processing point are able to monitor and probe a wide geographical area without being physically present at the target location.

FIG. 1 shows a wireless sensor network 10. The wireless sensors 12 are deployed in a perimeter fence. Intrusion by an intruder 16 that is detected 14 will be conveyed to the data gathering and processing point 24 and an alert may be triggered.

Wireless sensor networks suffer from serious energy constraints since the sensor nodes are powered by a battery. In Yujie Zhu and Raghupathy Sivakumar, "Challenges: Communication through Silence in Wireless Sensor Networks", MobiCom '05, Aug. 28-Sep. 2, 2005, Cologne, Germany, an architecture uses packet timing to transmit information to conserve battery energy. In Zhu et al. a timer at the receiver node counts the data from the transmitter node by observing the packet timing.

FIG. 5 shows a timeline 30 for the transmitting from the transmitter node 32 and receiving at the receiver node 34 the control packets as described in Zhu et al. A start packet of two bits is transmitted 36 by the transmitter node 32 to initiate the timer at the receiver node 34 upon receipt 42 by the receiver node 34. Upon counting to the intended value 40 of n counts, the transmitter node 32 sends 38 a STOP packet of two bits to terminate the timer once the stop packet is received 44 by the receiver node 34. The numerical value counted by the timer is accepted as the transmitted information.

The communication methodology in Zhu et al. is referred to as virtual communication through delay response (VCDR). The primary motivation for VCDR is energy saving because no real information is physically transmitted. The power efficiency in VCDR is due to data suppression. By using merely start and stop packets, two wireless sensor nodes can exchange data without having to transmit the data bits physically. As power consumption is proportional to the length of data bits transmitted, the data suppression in VCDR reduces transmission and reception power.

Zhu et al. presents three optimization strategies and five challenges for VCDR.

The first optimization strategy is multiplexing. The silence time interval between the start and stop packets is used by another pair of nodes to communicate without causing interference. The second optimization strategy is cascading. The transmitter node has multiple numerical values to be sent to the receiver node and arranges the values in ascending order. The first communication session relays the lowest numerical value, and the subsequent communication sessions relay the higher numerical values by making the timer at the receiver node start counting from the previous counted value. This reduces the total time to relay the data. The third optimization strategy is fast-forwarding. The receiver node, upon receiving the start packet, immediately retransmits it to a downstream node without waiting for the stop packet. Similarly, upon receiving the stop packet, the receiver node retransmits it to the downstream node so that the same value is counted at the receiver and downstream nodes.

A challenge is framing in which the optimal length of data to be sent has to be determined. Shorter data leads to higher energy consumption due to more start and stop packets whereas longer data may introduce excessive delay. Another challenge is addressing. Adding a node unique address to the packet header increases overhead and lowers efficiency. Another challenge is sequencing. Adding a sequence number to the start packet increases the packet size. An additional challenge is contention control. Although the start and stop packets are relatively short, packet collision may occur. A further challenge is error control. New error control strategies are needed for VCDR.

VCDR has several critical drawbacks.

A first drawback of VCDR is time synchronization between the transmitter and receiver nodes. Delay variations between the start and stop packets due to transmission and propagation variables can easily corrupt the data and render VCDR impractical.

Another drawback of VCDR is the lack of error control techniques. Since VCDR is a relatively new and unknown communication technique, existing error control techniques are insufficient.

Still another drawback of VCDR is packet loss. For example, the loss of the stop packet can cause the receiver node to count excessively or indefinitely and in turn consume excessive energy.

There is thus a need for a method of communicating between nodes in an energy efficient manner in a network environment that alleviates the problems associated with current communication techniques.

SUMMARY

The present invention provides a method for transmitting data between first and second nodes in a network that overcomes the drawbacks mentioned above.

The method comprises (a) the first node sending a start packet to the second node, (b) the first node starting a first counter concurrently with sending the start packet, wherein the first counter adds a first count a predetermined count time after the first counter starts and then adds another first count the count time after the most recent first count to accumulate first counts while the first counter is running, (c) the second node starting a timer in response to the start packet, (d) the second node starting a second counter in response to the timer running for a predetermined delay time, wherein the second counter adds a second count the count time after the second counter starts and then adds another second count the count time after the most recent second count to accumulate second counts while the second counter is running, (e) the first node stopping the first counter and sending a stop packet to the second node in response to the first node determining that the number of accumulated first counts corresponds to the data, thereby transmitting the data solely as a time interval between the start and stop packets, and (f) the second node stopping the second counter in response to the stop packet and determining the data based on the number of accumulated second counts, thereby determining the data based solely on the time interval between the start and stop packets.

The first node may avoid communication with the second node between the start and stop packets.

The first node may encode the data into a first count value and then send the stop packet to the second node in response to the number of accumulated first counts reaching the first count value, and the second node may decode the number of accumulated second counts into an intermediate value and then increment the intermediate value by one to obtain the data. Thus, the number of accumulated first counts may be one greater than the number of accumulated second counts.

The delay time may be less than the count time. For instance, the delay time may be 40 to 50 percent of the count time, and preferably about 50 percent of the count time. The delay time may also be greater than a propagation time between the first node sending a packet to the second node and the second node receiving the packet from the first node. The delay time may also reduce error sensitivity of the second node determining the data due to variations in a propagation time between the first node sending a packet to the second node and the second node receiving the packet from the first node.

The first node may append padded bits to the data and stop the first counter and then send the second node the stop packet in response to the first node determining that the number of accumulated first counts corresponds to the data and the padded bits, and the second node may determine the data and the padded bits based on the number of accumulated second counts and then determine the data by stripping the padded bits. The padded bits may have a predetermined value about half-way between a maximum value and a minimum value and independent of the data. For instance, the padded bits may have a most significant bit set to a first binary value and remaining bits set to a second binary value. The padded bits may also have a greater bit length than the start and stop packets. For instance, the padded bits may be three bits and the start and stop packets may each be two bits. The padded bits may also reduce error sensitivity of the second node determining the data due to variations in a propagation time between the first node sending a packet to the second node and the second node receiving the packet from the first node.

The second node may send an acknowledge packet to the first node and stop the second counter and determine the data in response to the number of accumulated second counts being less than a predetermined count limit, and send a non-acknowledge packet to the first node and stop the second counter and not determine the data in response to the number of accumulated second counts reaching the count limit. The first node may resend the start and stop packets to the second node in response to the non-acknowledge packet. The first node may also enter a power save mode in response to sending the stop packet and exit the power save mode in response to receiving either of the acknowledge and non-acknowledge packets.

The first and second nodes may be motion detectors and the network may be a peer-to-peer wireless sensor network such as a perimeter fence that triggers an alert in response to either of the first and second nodes detecting motion of an intruder.

Advantageously, the present invention is well-suited for VCDR in a peer-to-peer wireless network.

Another advantage is that the second node starts the timer upon receiving the start packet and starts the second counter after the delay time expires, thereby introducing an artificial delay that reduces error sensitivity to transmission and propagation variations between the start and stop packets. As a result, the second node is less susceptible to delay variations between the start and stop packets that might otherwise corrupt the data.

Another advantage is that the first node appends the padded bits and the second node strips the padded bits, thereby introducing redundant bits that improve error control. As a result, the second node is less susceptible to data errors that exceed a clock cycle.

Another advantage is that the first and second nodes engage in a handshaking protocol using the acknowledge and non-acknowledge packets, thereby conserving power at both the first and second nodes in the event a start or stop packet is lost.

These and other objects, features and advantages of the present invention will become apparent to those skilled in the art in view of the detailed description and drawings that follow.

BRIEF DESCRIPTION OF THE DRAWINGS

Embodiments of the present invention may be fully and more clearly understood by way of non-limitative examples from the following description taken in conjunction with the accompanying drawings in which like reference numerals designate similar or corresponding elements, and in which.

DETAILED DESCRIPTION

The present invention is illustrated as a peer-to-peer data communication technique for nodes in a wireless sensor network based on virtual communication through delay response (VCDR). Two key advantages of VCDR are energy savings and data security.

VCDR reduces energy consumption and enhances data security by time counting at the nodes rather than transmitting the actual data. For a specific numerical value n to be transmitted, the transmitter node initiates the data transmission process by sending a start packet to the receiver node. Upon receiving the start packet, the receiver node activates a counter and starts counting the time that has elapsed. The counter triggers once for every fixed period of time and each firing event represents one count. Therefore, the receiver node counts consecutively from 1 to a finite number depending on the time elapsed. The transmitter node operates its own counter in a similar manner. Once the transmitter node has counted to the value n, the transmitter node sends a stop packet to the receiver node. Likewise, once the receiver node has counted to the value n, the receiver node receives the stop packet from the transmitter node to stop the counter. As a result, the receiver node is able to derive the intended value n without the transmitter node having to transmit the data physically.

The present invention is well-suited for VCDR in a perimeter fence using a wireless sensor network that uses the sensor nodes as motion detectors. Given a secure location such as a military base, airport or government building that must be protected from intrusion, the sensor nodes can be placed strategically around the facility to detect movement. During normal operation, the sensor nodes update environmental readings at a low data rate to save energy. However, if a suspected intruder is detected, then the sensor nodes may switch to alert mode and update the sensed data more frequently.

The present invention is well-suited for VCDR in other wireless sensor networks that require high energy saving and/or high data security. For instance, the sensor nodes can be motion detectors that monitor movement of intruders, people, animals and the like. Alternatively, the sensor nodes can monitor humidity, temperature and the like as well as single or multiple phenomena.

Figure 1:
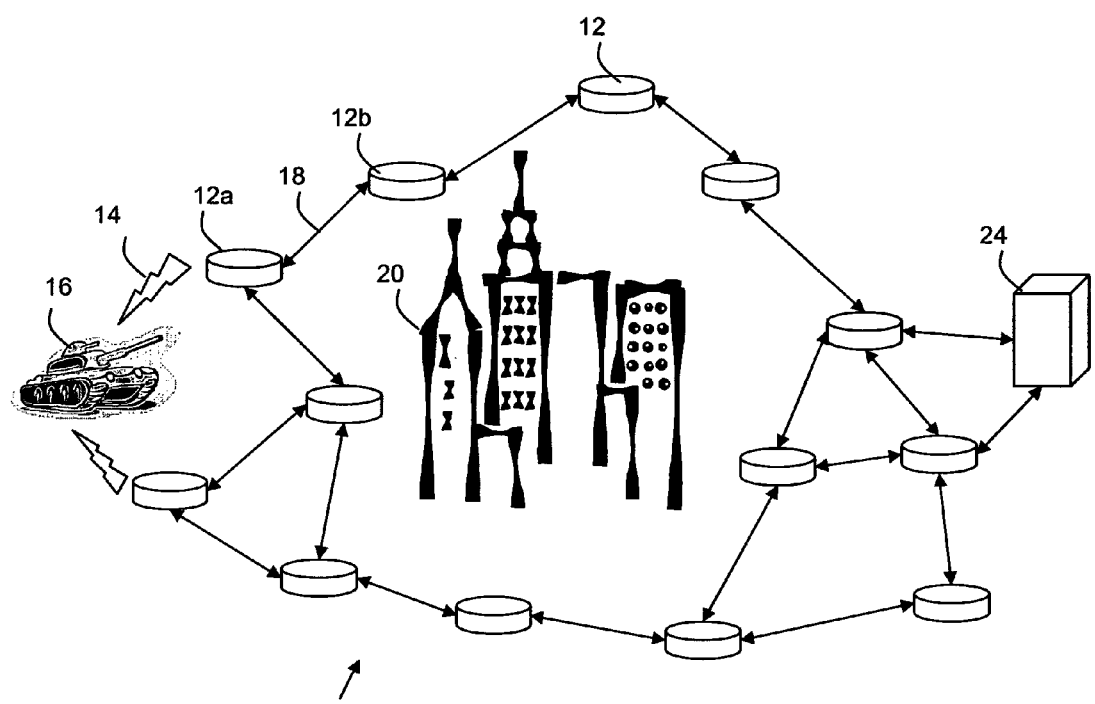
FIG. 1 shows a wireless sensor network with nodes using peer-to-peer communication in which the present invention may be employed.
Figure 2:
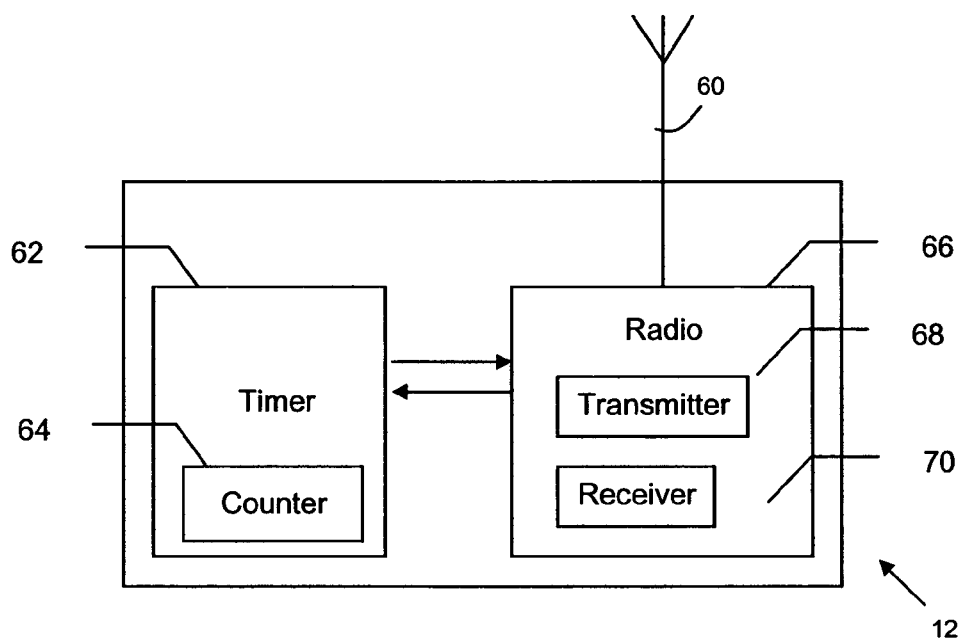
FIG. 2 shows a node within the wireless sensor network.

FIG. 2 shows the basic architecture of a wireless sensor node 12. The wireless sensor node 12 includes a timer module 62 and a radio module 66. The timer module 62 is an internal clock that initiates one or more counters 64 depending on the application requirement. The counter 64 is normally initiated with the value 0 and a resolution of $t_c$. For example, the counter 64 may count every 5 seconds. The radio module 66 contains an antenna 60, a transmitter 68 and a receiver 70. The transmitter 68 sends information to a receiver node whereas the receiver 70 receives information from a transmitter node.

A variety techniques for obtaining and communicating data obtained at the sensor nodes 12 to the data gathering and processing point 24 may used. For example, data to be transmitted to the data gathering and processing point 24 may include an identification number identifying the source, such as the node 12 or the data gathering and processing point 24, of the transmitted data. The communication may be one-way or two-way depending on the specific application. Once received at the data gathering and processing point 24 the data may then be processed. For example if detection is sensed at the node 12, then the data gathering and processing point 24 may send a request to the node 12 to increase the sensing rate. It will be appreciated that other techniques may be employed to transmit data from the nodes 12 to the data gathering and processing point 24.

Figure 3:
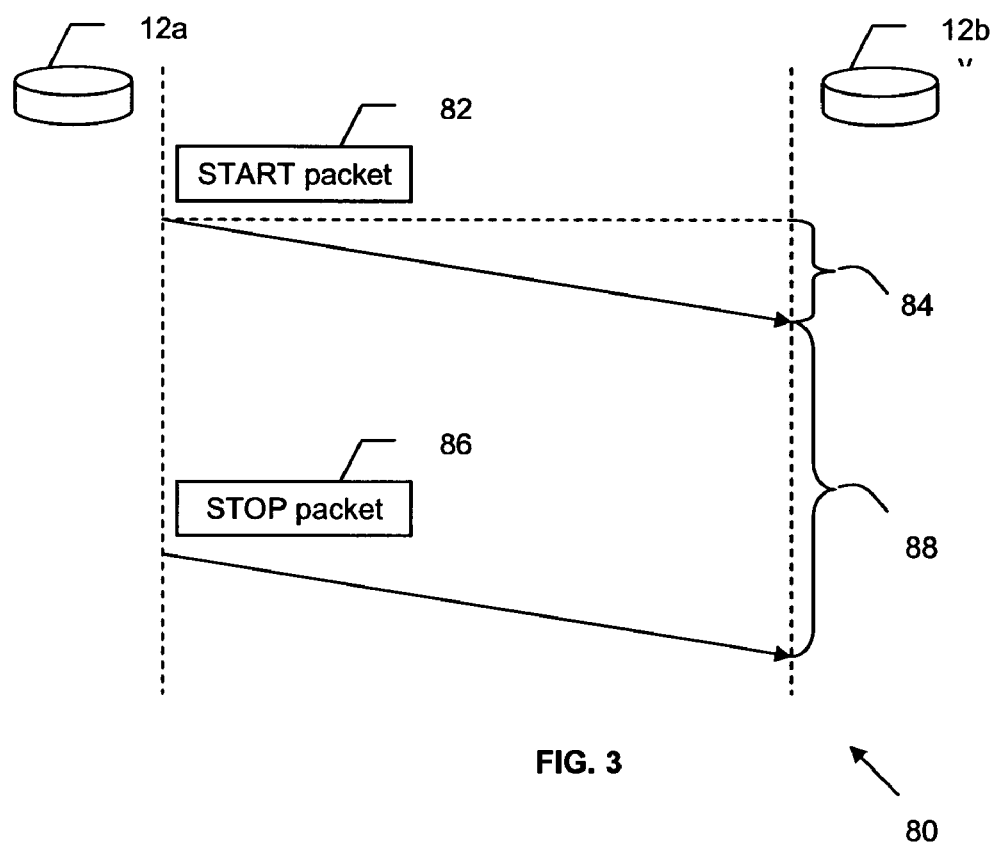
FIG. 3 shows a communication session between two nodes using virtual communication through delay response (VCDR) in the wireless sensor network.

FIG. 3 illustrates two sensor nodes 12a and 12b that engage in VCDR peer-to-peer communication. The transmitter node 12a initiates a communication session by sending a start packet 82 to the receiver node 12b. Concurrently with (i.e., immediately before, immediately after, or simultaneously with) sending the start packet, the transmitter node 12a initiates a counter and counts with the pre-defined clock resolution. The transmitter node 12a, in anticipation that the counter of the receiver node 12b has reached the intended value, sends a stop packet 86 to terminate the counter of the receiver node 12b. Regardless of the time interval for data relay 84 between sending the start or stop packets and receiving the start or stop packets, the accuracy of the data is subject to delay variations between the arrival of the start and stop packets at the receiver node 12b. The present invention solves this problem.

By relaying information through time counting to the receiver node 12b, the transmitter node 12a reduces energy consumption since no real information is transmitted. The transmitter node 12a only needs to expend energy for the small start and stop control packets 82 and 86 that regulate the receiver node 12b counter. For example, the start and stop packets can each be merely two bits. The transmitter node 12a saves energy by sending only the start and stop packets 82 and 86 for one data transmission session. At the receiver node 12b, the main energy consumption is associated with receiving the start and stop packets 82 and 86. Energy is needed to power the electronic components that listen to the wireless channel and process the data received. Deriving of the real data from the time counting process expends energy for the receiver node 12b on-board microprocessor. However, this energy for powering the microprocessor is typically lower than the energy required for receiving the data. Thus, the receiver node 12b saves energy by suppressing the real information to be received.

Another advantage of this peer-to-peer VCDR technique is data security. The transmitter node 12a completes one communication session by sending only the start and stop packets 82 and 86. As no real data is transmitted, this minimizes the risk of eavesdropping by unintended receivers. This feature is especially useful in transmitting critical data. Apart from that, an unintended node must possess the predefined timer resolution in order to derive the real information being relayed. Therefore, the chance that the information can be deciphered by an unintended node is remote.

Three techniques are presented in accordance with the present invention for peer-to-peer VCDR which improve data accuracy and power efficiency. The three techniques complement each other and constitute a protocol suite for real implementation. For ease of reference, these three techniques are referred to as time shift, error protection and count limit.

Time shift solves the time synchronization problem that affects the accuracy of this communication technique. As the present invention relies on time counting, the data being conveyed is sensitive to the internal clocks at the transmitter node and receiver node. Any delay variations in receiving or processing the start and stop packets may compromise the data accuracy as the receiver node's counter may overshoot or undershoot. Time shift solves this problem by first setting the clock resolution to a value that can tolerate unanticipated delay variations. In other words, each count at the counter is spaced sufficiently wide in time interval so that the probability of counter overshooting is minimized. Time shift also introduces an artificial delay at the receiver node to minimize undershooting events.

Error protection provides an extra layer of safety to ensure data accuracy. Error protection adds to the original data a string of redundant padded bits. The padded bits are appended to the end of the data and adjusted such that the data can further tolerate counter overshooting and undershooting errors. Once the receiver node has derived this augmented data through time counting, it strips the padded bits to obtain the original data. Although the padded bits increase the length of data to be sent, they protect the original data from a higher degree of delay variations in sending and receiving the start and stop packets.

Count limit safeguards the transmitter node and receiver node from excessive or indefinite time counting if the start or stop packets are lost. The start and stop packets may be lost due to packet collision or unforeseen signal attenuation. The count limit maintains an upper limit that a counter can count to before it is terminated automatically. Thus, once the upper limit has been reached, it informs the nodes that the signal is lost and retransmission and optionally a transmission power increment may be needed.

Figure 4A:
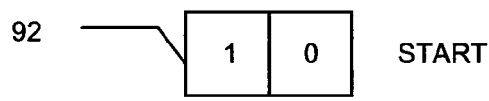
FIGS. 4A-4D show start and stop packets transmitted between the nodes.
Figure 4B:
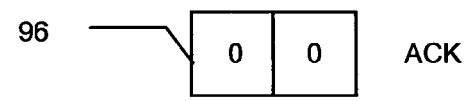
Figure 4C:
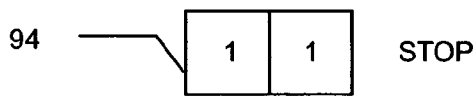
Figure 4D:
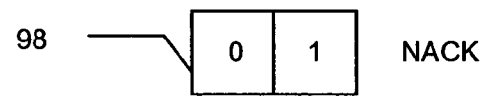
Figure 5:
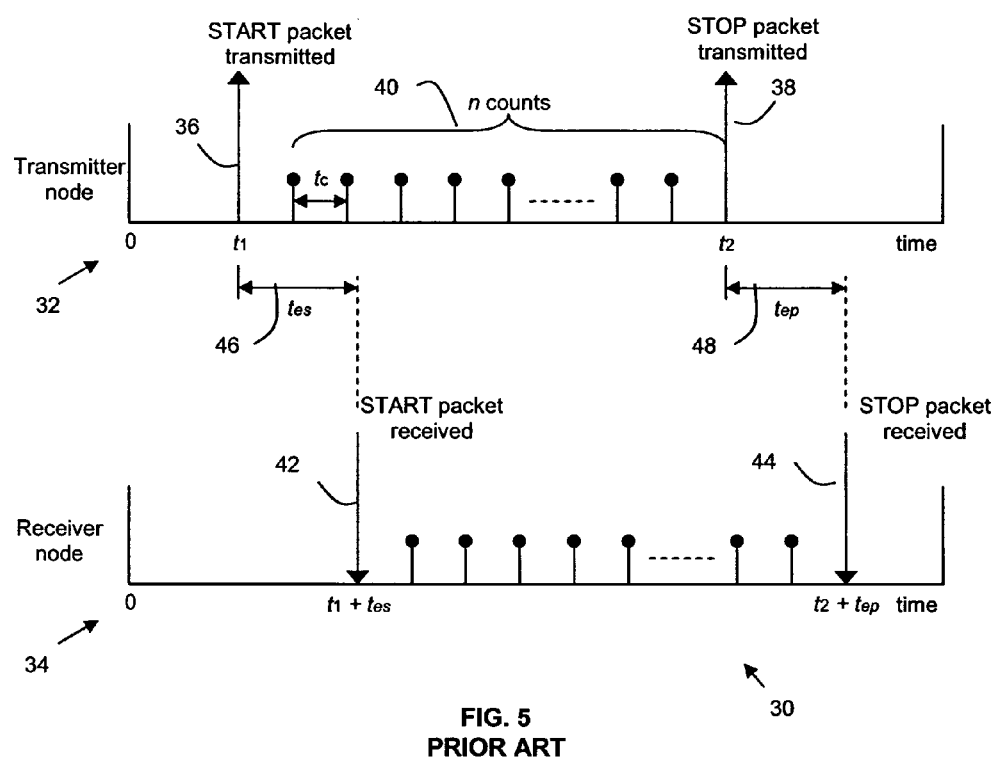
FIG. 5 shows a timeline for transmitting and receiving the start and stop packets.
Figure 6:
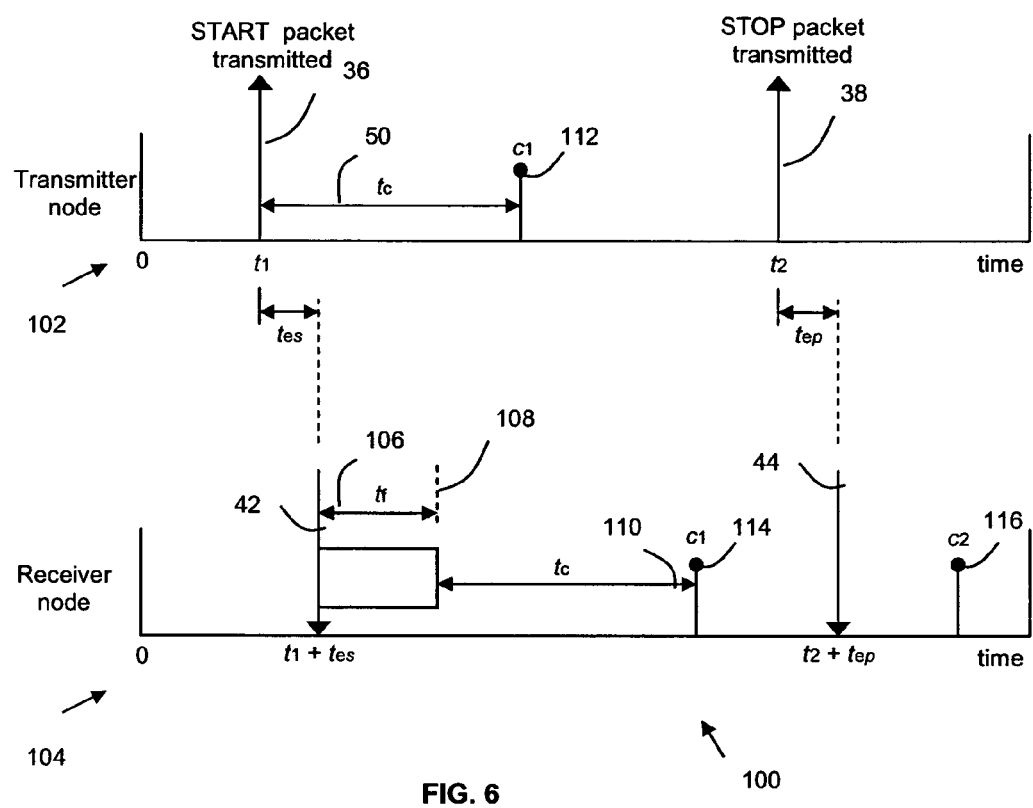
FIG. 6 shows a timeline for transmitting and receiving the start and stop packets using an artificial delay $t_f$ at the receiver node to minimize undershooting in accordance with the present invention.

The present invention improves conventional VCDR. Given a pair of wireless sensor nodes which are engaged in wireless communication, the transmitter node initiates a communication session by sending a start packet 92. FIG. 4A shows the structure of the start packet 92. It consists of two of bits data with binary value 10. Similar to the start packet 92, the stop packet 94 also consists of two bits data with binary value 11. FIG. 4B shows the structure of the stop packet 94. In this embodiment the start and stop packets consist of two bits of data, but it will be appreciated that the packets may contain different numbers of bits Once the transmitter node has sent the start packet, it will start its own counter with resolution $t_c$, denoting that the counter will increase one count 112 every $t_c$ as shown in FIGS. 5 and 6. Upon receiving the start packet, the receiver node will also start its counter with the same resolution $t_c$. If the data to be sent is a numerical value n, the transmitter node will send a stop packet to the receiver node at time $nt_c$ after the start packet. The receiver node will stop its counter immediately once it has received the stop packet and derive the data from its current counter value. A communication session is completed by the receiver node sending an acknowledge packet, ACK 96, to the transmitter node.

If retransmission is required, the receiver node may transmit a non-acknowledge packet, NACK 98, to the transmitter node. The ACK 96 and NACK 98 packets are discussed in further detail below. Although this peer-to-peer communication technique is straightforward, the accuracy of the data is highly sensitive to the delay variations in receiving the start and stop packets by the receiver node. These delay variations could cause the timer to overshoot or undershoot by one count or more, which will compromise the data being relayed. Therefore, the present invention provide techniques that enhance the ability to tolerate delay variations and improve data accuracy.

Time Shift

Given that the actual data being relayed depends on the start and stop packets sent by the transmitter node, the accuracy of the data is highly sensitive to the time these packets are received by the receiver node. The time it takes for a packet, e.g. the start packet or the stop packet, to reach the receiver node from the transmitter node can be divided into a propagation delay $t_p$ and a transmission delay $t_r$. The propagation delay is the time interval for a packet to travel from the transmitter node's antenna to the receiver node's antenna through wireless communication. The transmission delay is the amount of time required to transmit or receive the packet to or from the wireless medium. Thus, the end-to-end delay 46 and 48 experienced by a packet is given by $t_e = t_p + t_r$. This delay is shown in FIG. 5.

FIG. 6 illustrates the timeline 100 for a transmitter node 102 and a receiver node 104 when communication occurs in accordance with the present invention. A vertical line segment ended with black bubble represents one count. The time duration 50 and 110 between each count is given by $t_c$. The transmitter node 102 transmits 36 the start packet at time $t_1$ and the stop packet at time $t_2$, where $t_2 = t_1 + n_s \cdot t_c$. Thus, the number of counts at the transmitter node 102 is given by, $$n_s = \frac{t_2 - t_1}{t_c} \quad (1)$$

At the receiver node 104, the start packet is received 42 at time $t_{START} = t_1 + t_{es}$ whereas the stop packet is received 44 at time $t_{STOP} = t_2 + t_{ep}$. The number of counts at the receiver node 104 is given by, $$n_r = \frac{t_{STOP} - t_{START}}{t_c} = \frac{t_2 - t_1 + t_{ep} - t_{es}}{t_c} \quad (2)$$

$$n_r = \frac{nt_c + t_{ep} - t_{es}}{t_c}$$

In order for $n_r = n_s = n$, the numerator in equation (2) must satisfy the following inequality, $$nt_c \leq nt_c + t_{ep} - t_{es} < nt_c + t_c, \text{ or}$$

$$0 \leq t_{ep} - t_{es} < t_c \quad (3)$$

The overshooting and undershooting events at the receiver node 104 are defined as, $$t_{ep} - t_{es} \geq t_c \Rightarrow n_r > n, \text{ overshooting.} \quad (4)$$

$$t_{ep} - t_{es} < 0 \Rightarrow n_r < n, \text{ undershooting.} \quad (5)$$

Time shift minimizes overshooting by assigning $t_c$ with a large enough value such that $t_c \gg t_{ep}$ and $t_c \gg t_{es}$. Thus, it ensures that the condition ($t_{ep} - t_{es} < t_c$) is met. However, with regard to the undershooting event there is no direct control over the end-to-end delay of the packet transmission. In the present invention, time shift introduces an artificial delay to the receiver node 104 to defer its counter start time such that the number of counts at the receiver node 104 is systematically lower than the intended count by one, or $n_r = n - 1$. FIG. 6 illustrates the introduction of an artificial delay 106 $t_f$ to the receiving node 104.

As an example, for the specific case in FIG. 6, the transmitter node 102 wants to relay a numerical value of 2 to the receiver node 104. The transmitter node 102 will transmit 36 the start packet at $t_1$ and transmit 38 the stop packet at $t_2$, where $t_2 = t_1 + 2t_c$. Although the receiver nod 104 receives 42 the start packet at $t_{START} = t_1 + t_{ep}$, its counter only starts 108 after $t_f$ seconds 106 later. This artificial delay 106 is adjusted such that the stop packet is received 44 between the count $c_1$ 114 and the count $c_2$ 116. This enables the receiver node 104 to tolerate variations of end-to-end signal delay and overcome overshooting and undershooting problems. In order for the receiver to systematically obtain $n_r = n - 1$, the following inequality is satisfied, $$nt_c - t_c \leq t_{STOP} - (t_{START} + t_f) < nt_c, \text{ or}$$

$$nt_c - t_c \leq nt_c + t_{ep} - t_{es} - t_f < nt_c, \text{ or}$$

$$t_{ep} - t_{es} < t_f \leq t_c + t_{ep} - t_{es} \quad (6)$$

With the inequality in equation (6), it is possible to reduce data inaccuracy due to delay variations by adjustments such that $t_c \gg t_f$, $t_f \gg t_{ep}$ and $t_f \gg t_{es}$. Since this methodology reduces count, it can be remedied easily by adding 1 back to $n_r$ after the counting is complete. Alternatively, $n_s$ can be increased by 1 if $n_r$ is left unchanged. In laboratory testing using two Crossbow Mica2 motes spaced 3 meters apart with settings of $t_c = 100$ ms and $t_f = 50$ ms, accurate results were demonstrated.

Error Protection

The time shift enhances data accuracy under normal conditions when the end-to-end delay of the start and stop packets is relatively small in comparison to the timer resolution $t_c$ and artificial delay $t_f$. However, wide fluctuations to the end-to-end delay may corrupt the data being relayed. Error protection is designed to improve data accuracy by padding extra bits to the end of the original data to be relayed as shown in FIGS. 7A-7F and FIGS. 8A-8F. Assuming that the original data is a numerical value n, for each bit padded to the end, n will double its value. Thus, if k bits are padded, then the original data will become $n \times 2^k$. This augmented original data will be relayed to the receiver node and the padded bits will be stripped afterwards to obtain the correct value.

Figure 7A:
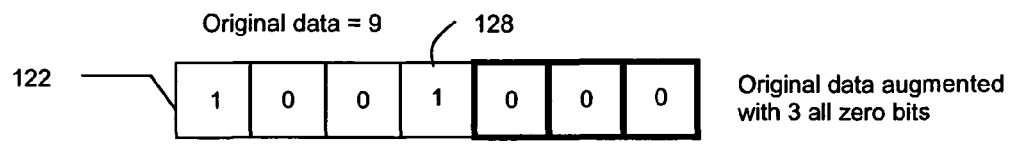
FIGS. 7A-7F shows padded bits appended to the data in accordance with the present invention.
Figure 7B:
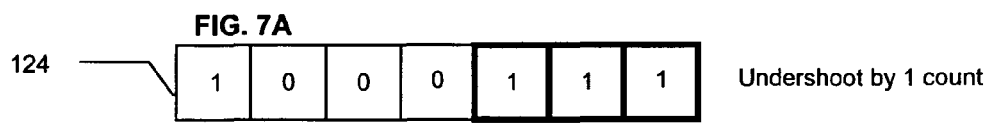
Figure 7C:
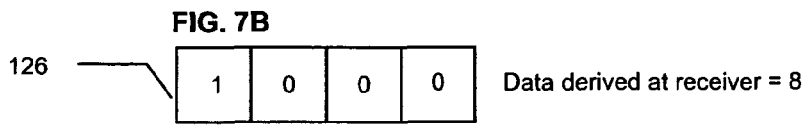
Figure 7D:
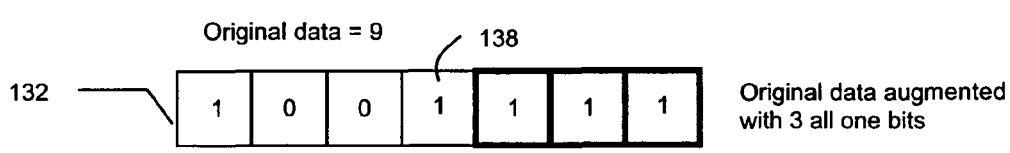
Figure 7E:
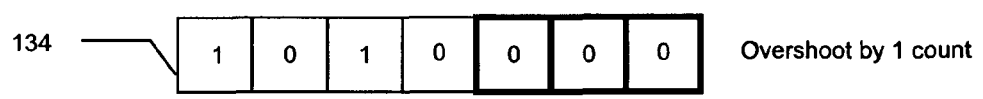
Figure 7F:
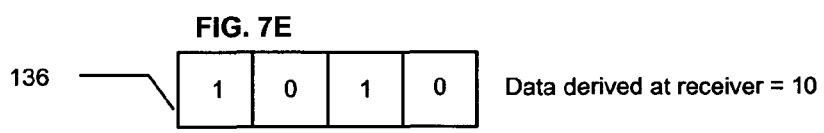

In order to effectively protect the data, the padded bits are not set to all zeroes 122 or all ones 132. If the padded bits are set to all zeroes 122 as shown in FIGS. 7A-7C, an undershooting event 124 may corrupt the data 126. Conversely, if the padded bits are set to all ones 132 as shown in FIGS. 7D-7F, the data will be prone to overshooting errors 134 and 136. FIGS. 7A-7F illustrate these disadvantages. An undershooting or overshooting event causes the least significant bit 128 or 138 of the original data to change.

Figure 8A:
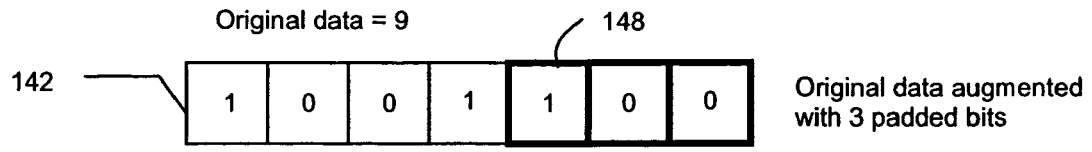
FIGS. 8A-8F shows padded bits appended to the data in accordance with the present invention.
Figure 8B:
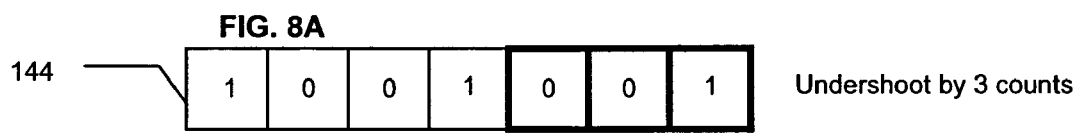
Figure 8C:
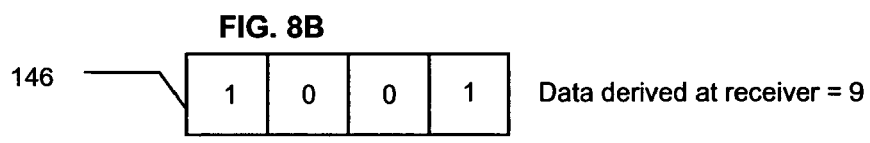
Figure 8D:
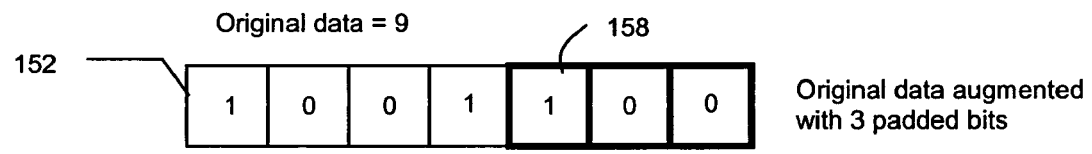
Figure 8E:
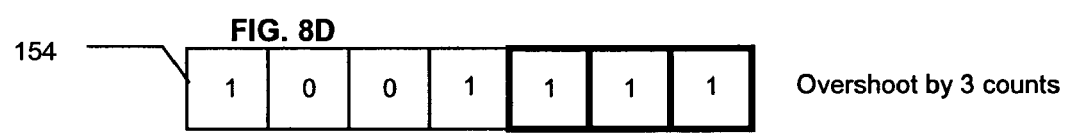
Figure 8F:
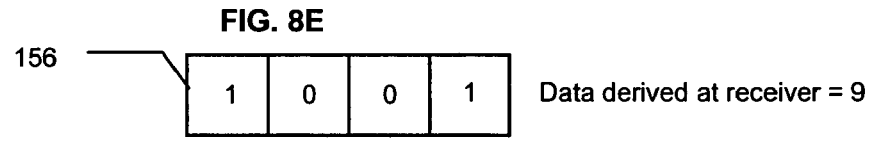

Turning to FIGS. 8A-8F, the error protection designs the padded bits by assigning the most significant bit 148 or 158 to one and the rest of the padded bits to zero as shown in FIGS. 8A and 8D, respectively. As such, given k number of padded bits, protection is provided from overshooting events 154 by ($2^{k-1}-1$) counts as shown in FIG. 8D. In addition, protection is provided from undershooting events 144 by ($2^{k-1}$) counts as shown in FIG. 8B. Thus, the original data n will increase to the value $n \times 2^k + 2^{k-1}$ 142 or 152 as shown in FIGS. 8A and 8D, respectively.

Count Limit

In order to enable successful communication between two wireless sensor nodes using VCDR, the present invention provides a protocol that deals with the possible loss of the start and/or stop packets. The protocol includes an acknowledgment mechanism (ACK) and retransmission that perform similar tasks as described in the Transmission Control Protocol (TCP), "Transmission control protocol", IETF RFC 793, Darpa Internet Program, September 1981. ACK is used by the receiver node to inform the transmitter node that a packet is received successfully. If no ACK is indicated by the receiver node within a reasonable time period, then the transmitter node will retransmit the packet presuming the packet is lost. Despite the similarities of ACK and retransmission in TCP as compared to the protocol herein, the functionalities of the protocol herein differs vastly from TCP. VCDR needs both the start and stop packets for the receiver node to derive the information transmitted by the transmitter node. A loss of either packet is a unique problem facing VCDR and the receiver node may have to inform the transmitter node of this situation.

Figure 9:
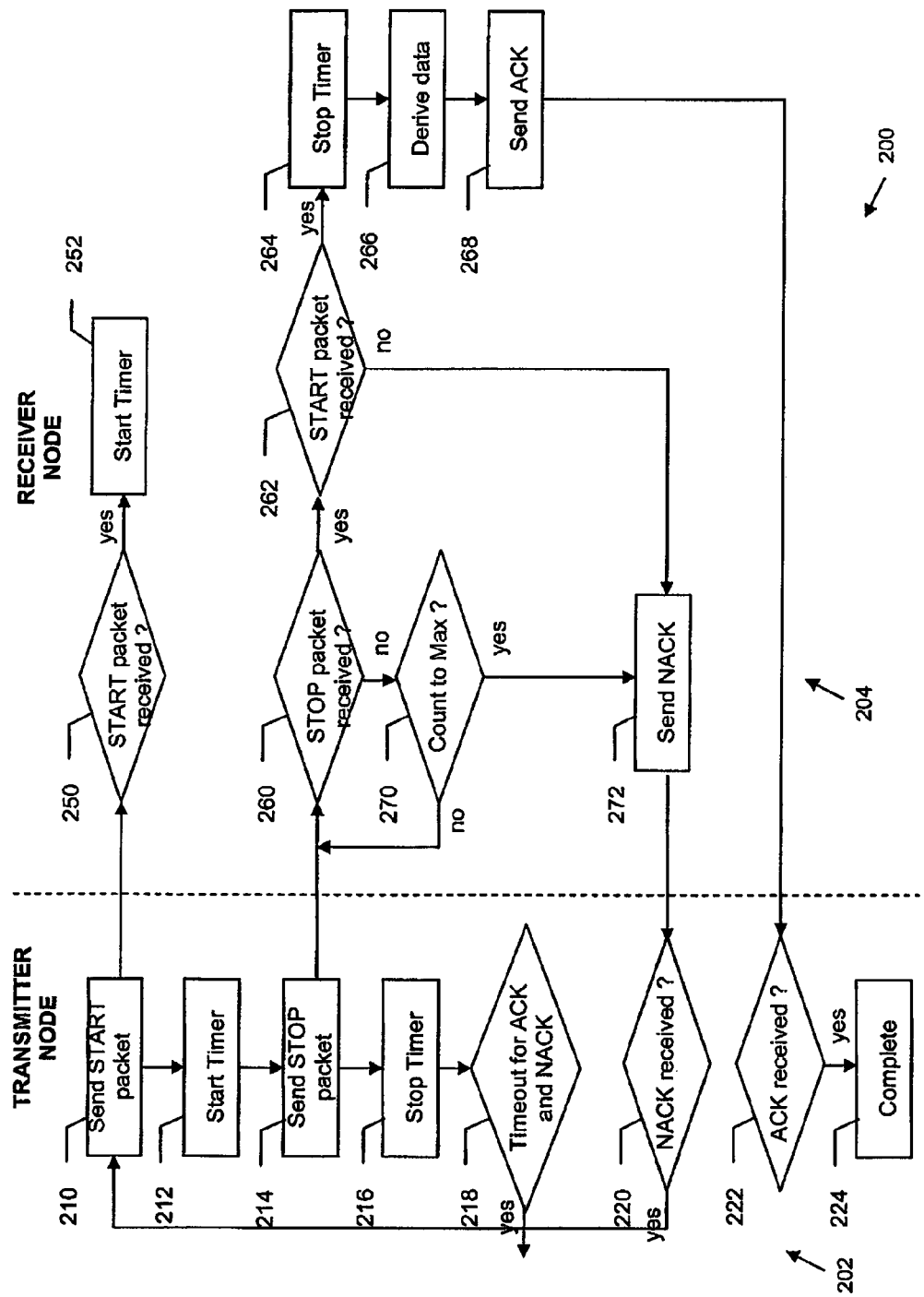
FIG. 9 shows a flow chart of a communication session between the nodes using start, stop, acknowledge and non-acknowledge packets in accordance with the present invention.

FIG. 9 shows the flow chart 200 of activities taken by the transmitter node 202 and the receiver node 204 to complete a communication session. These activities constitute a set of complete protocols that ensure the successful relaying of data from the transmitter node 202 to the receiver node 204.

During the transmission of the start and stop packets, it is possible that these packets may be lost in transmission. The protocol ensures that data is relayed successfully from the transmitter node 202 to the receiver node 204. Given the data to be relayed, the transmitter node 202 will send the start and stop packets 210 and 214 regardless of the receiving outcome at the receiver node 204. In this respect, there are four different possible scenarios at the receiver node 204,
1. Start and stop packets are received successfully.
2. Start packet is received but stop packet is lost in transmission.
3. Start packet is lost in transmission but stop packet is received.
4. Start and stop packets are lost in transmission.

If the start and stop packets are received successfully, then the receiver node 204 derives the data being relayed. Upon receiving the stop packet 260, the receiver node 204 transmits a positive acknowledgement ACK 268 to the transmitter node 202 to denote that the data is received successfully 222 to complete the session 224.

The counter of the receiver node 204 starts counting 252 upon receiving the start packet 250, and continues counting until a stop packet is received 260 and 262 and then the timer is stopped 264. The data is derived 266 and the receiver node 204 sends the ACK packet to transmitter node 268. However, if the stop packet is lost in transmission, then the receiver node 204 consumes excessive energy due to non-stop counting. Advantageously, the count limit provides the maximum count 270 the receiver node's counter can attain. If the counter hits the maximum count, then it will stop its clock immediately and infer that the stop packet is lost 270. The receiver node 204 will then send a negative acknowledgement (NACK) 272 to the transmitter node 202 to initiate a retransmission. Thus, the transmitter node 202 and the receiver node 204 have a common maximum count. If the transmitter node 202 attempts to relay a numerical value which is larger than the maximum count maintained at the receiver node 204, then it may not be detected since the receiver node 204 will transmit NACK as soon as its timer count hits the maximum count value. In order to share a common maximum count, the maximum count value is transmitted to all the sensor nodes in the wireless sensor network.

For the scenario that the start packet is lost in transmission, the receiver node 204 will not be aware that the transmitter node 202 has initiated a data transmission. Thus, the receiver node's counter remains inactive and no energy associated with counting is consumed. However, if the receiver node 204 detects the stop packet subsequently 260, 262 then it will conclude that the start packet is lost and it is not able to derive the data being relayed. Under such an event, the receiver node 204 transmits a NACK 272 to the transmitter node 202 immediately to initiate a retransmission 210, 212, 214, 216 and 218.

In the event that both the start and stop packets are lost, the receiver node 204 will not be aware of the transmission session and no NACK will be sent to the transmitter node 202. The transmitter node 202, in anticipation of an ACK or NACK, will wait a short period of time 218 before retransmitting the start and stop packets again 210, 212, 214, 216 and 218. However, for a sensor network that updates information regularly, the retransmission may not be necessary if the receiver node 204 emphasizes the most up-to-date information. By the time the transmitter node 202 initiates a retransmission, new information may be available which renders the previous information irrelevant.

While embodiments of the present invention have been described and illustrated, it will be understood by those skilled in the technology concerned that many variations or modifications in details of design or construction may be made without departing from the present invention.

The invention claimed is:

1. A method for transmitting data between first and second nodes in a network, comprising:
    the first node sending a start packet to the second node;
    the first node starting a first counter concurrently with sending the start packet, wherein the first counter adds a first count a predetermined count time after the first counter starts and then adds another first count the count time after the most recent first count to accumulate first counts while the first counter is running;
    the second node starting a timer in response to the start packet;
    the second node starting a second counter in response to the timer running for a predetermined delay time, wherein the second counter adds a second count the count time after the second counter starts and then adds another second count the count time after the most recent second count to accumulate second counts while the second counter is running;

the first node stopping the first counter and sending a stop packet to the second node in response to the first node determining that the number of accumulated first counts corresponds to the data, thereby transmitting the data solely as a time interval between the start and stop packets; and the second node stopping the second counter in response to the stop packet and determining the data based on the number of accumulated second counts, thereby determining the data based solely on the time interval between the start and stop packets, wherein the delay time is less than the count time.

2. The method of claim 1, wherein the first node does not communicate with the second node between the start and stop packets.

3. The method of claim 1, wherein:
the first node encodes the data into a first count value and then sends the stop packet to the second node in response to the number of accumulated first counts reaching the first count value; and the second node decodes the number of accumulated second counts into an intermediate value and then increments the intermediate value by one to obtain the data.

4. The method of claim 1, wherein the number of accumulated first counts is one greater than the number of accumulated second counts.

5. The method of claim 1, wherein the delay time is 40 to 50 percent of the count time.

6. The method of claim 1, wherein the delay time is about 50 percent of the count time.

7. The method of claim 1, wherein the delay time is 50 percent of the count time.

8. The method of claim 1, wherein the delay time is greater than a propagation time between the first node sending a packet to the second node and the second node receiving the packet from the first node.

9. The method of claim 1, wherein the delay time reduces error sensitivity of the second node determining the data due to variations in a propagation time between the first node sending a packet to the second node and the second node receiving the packet from the first node.

10. The method of claim 1, wherein the start and stop packets are each two bits.

11. The method of claim 1, wherein:
the first node appends padded bits to the data;
the first node stops the first counter and sends the second node the stop packet in response to the first node determining that the number of accumulated first counts corresponds to the data and the padded bits;
the second node determines the data and the padded bits based on the number of accumulated second counts; and
the second node determines the data by stripping the padded bits.

12. The method of claim 11, wherein the padded bits have a predetermined value that is about half-way between a maximum value and a minimum value and is independent of the data.

13. The method of claim 11, wherein the padded bits have a most significant bit set to a first binary value and remaining bits set to a second binary value, wherein the most significant bit is the leftmost bit of the padded bits.

14. The method of claim 11, wherein the padded bits have a greater bit length than the start and stop packets.

15. The method of claim 11, wherein the padded bits reduce error sensitivity of the second node determining the data due to variations in a propagation time between the first node sending a packet to the second node and the second node receiving the packet from the first node.

16. The method of claim 1, wherein:
the second node sends an acknowledge packet to the first node and stops the second counter and determines the data in response to the number of accumulated second counts being less than a predetermined count limit; and
the second node sends a non-acknowledge packet to the first node and stops the second counter and does not determine the data in response to the number of accumulated second counts reaching the count limit.

17. The method of claim 16, wherein the first node resends the start and stop packets to the second node in response to the non-acknowledge packet.

18. The method of claim 16, wherein the first node enters a power save mode in response to sending the stop packet and exits the power save mode in response to receiving either of the acknowledge and non-acknowledge packets.

19. The method of claim 1, wherein the first and second nodes are motion detectors and the network is a peer-to-peer wireless sensor network.

20. A method for transmitting data between first and second motion detection nodes in a peer-to-peer wireless sensor network, comprising:
the first node sending a start packet to the second node;
the first node starting a first counter concurrently with to sending the start packet, wherein the first counter adds a first count a predetermined count time after the first counter starts and then adds another first count the count time after the most recent first count to accumulate first counts while the first counter is running;
the first node encoding the data into a first count number;
the second node starting a timer in response to the start packet;
the second node starting a second counter in response to the timer running for a predetermined delay time, wherein the second counter adds a second count the count time after the second counter starts and then adds another second count the count time after the most recent second count to accumulate second counts while the second counter is running, the delay time is less than the count time and the number of accumulated first counts is one greater than the number of accumulated second counts;
the first node stopping the first counter and sending a stop packet to the second node in response to the first node determining that the number of accumulated first counts has reached the first count number, thereby transmitting the data solely as a time interval between the start and stop packets; and
the second node stopping the second counter in response to the stop packet and determining the data based on decoding the number of accumulated second counts to obtain an intermediate value and then incrementing the intermediate value by one to obtain the data, wherein the delay time is less than the count time.

21. The method of claim 20, wherein the first node does not communicate with the second node between the start and stop packets.

22. The method of claim 20, wherein the delay time is 40 to 50 percent of the count time.

23. The method of claim 20, wherein the delay time is about 50 percent of the count time.

24. The method of claim 20, wherein the delay time is greater than a propagation time between the first node sending a packet to the second node and the second node receiving the packet from the first node.

25. The method of claim 20, wherein:
the first node appends padded bits to the data, wherein the padded bits have a predetermined value that is about half-way between a maximum value and a minimum value and is independent of the data;
the first node stops the first counter and sends the second node the stop packet in response to the first node determining that the number of accumulated first counts corresponds to the data and the padded bits;
the second node determines the data and the padded bits based on the number of accumulated second counts; and
the second node determines the data by stripping the padded bits.

26. The method of claim 25, wherein the padded bits have a most significant bit set to a first binary value and remaining bits set to a second binary value, wherein the most significant bit is the leftmost bit of the padded bits.

27. The method of claim 20, wherein:
the second node sends an acknowledge packet to the first node and stops the second counter and determines the data in response to the number of accumulated second counts being less than a predetermined count limit;
the second node sends a non-acknowledge packet to the first node and stops the second counter and does not determine the data in response to the number of accumulated second counts reaching the count limit; and
the first node resends the start and stop packets to the second node in response to the non-acknowledge packet.

28. The method of claim 27, wherein the first node enters a power save mode in response to sending the stop packet and exits the power save mode in response to receiving either of the acknowledge and non-acknowledge packets.

29. The method of claim 20, wherein the sensor network is a perimeter fence that triggers an alert in response to either of the first and second nodes detecting motion of an intruder.

* * * * *

UNITED STATES PATENT AND TRADEMARK OFFICE
CERTIFICATE OF CORRECTION

| | | |
|---|---|---|
| PATENT NO. | : 8,312,351 B2 | Page 1 of 1 |
| APPLICATION NO. | : 12/745730 | |
| DATED | : November 13, 2012 | |
| INVENTOR(S) | : Chun Hau Lau et al. | |

It is certified that error appears in the above-identified patent and that said Letters Patent is hereby corrected as shown below:

On the title page, item (73) assignee, change "Singapore Technologies Dynamics Ptd Ltd"

to -- Singapore Technologies Dynamics Pte Ltd --

Signed and Sealed this
Twenty-eighth Day of May, 2013

Teresa Stanek Rea
*Acting Director of the United States Patent and Trademark Office*